(12) United States Patent
Warren et al.

(10) Patent No.: US 12,098,022 B2
(45) Date of Patent: Sep. 24, 2024

(54) DEVICES AND METHODS FOR BLAST CONTAINMENT

(71) Applicant: Synthetik Applied Technologies, LLC, Austin, TX (US)

(72) Inventors: James Arthur Warren, Houston, TX (US); Jason Lovaine Blaylock, Houston, TX (US)

(73) Assignee: Synthetik Applied Technologies LLC, Austin, TX (US)

( * ) Notice: Subject to any disclaimer, the term of this patent is extended or adjusted under 35 U.S.C. 154(b) by 95 days.

(21) Appl. No.: 17/893,140

(22) Filed: Aug. 22, 2022

(65) Prior Publication Data

US 2023/0057445 A1 Feb. 23, 2023

Related U.S. Application Data

(60) Provisional application No. 63/235,646, filed on Aug. 20, 2021.

(51) Int. Cl.
*B65D 90/32* (2006.01)
*B32B 5/18* (2006.01)
(Continued)

(52) U.S. Cl.
CPC .............. *B65D 90/325* (2013.01); *B32B 5/18* (2013.01); *B32B 5/245* (2013.01); *B32B 15/04* (2013.01);
(Continued)

(58) Field of Classification Search
CPC ........ B65D 90/325; B65D 85/54; B32B 5/18; B32B 5/245; B32B 15/04; B32B 15/20; B32B 17/061
(Continued)

(56) References Cited

U.S. PATENT DOCUMENTS 3,949,928 A * 4/1976 Perkins ................... B65D 5/22
229/125.125
4,741,276 A * 5/1988 Pollock .................. E05G 1/024
109/82
(Continued)

OTHER PUBLICATIONS

International Search Report for App. No. PCT/US22/041127, Dated May 10, 23.
International Written Opinion for App. No. PCT/US22/041127.

*Primary Examiner* — J. Gregory Pickett
*Assistant Examiner* — Niki M Eloshway
(74) *Attorney, Agent, or Firm* — Ferguson Case Orr Paterson LLP

(57) ABSTRACT

Devices and methods for blast/fire containment are disclosed herein. Devices include containers designed to contain and/or mitigate high energy events such as blasts from explosions or thermal runaways. The containers include a body that is built to define an interior chamber shaped to receive an explosive device or a device susceptible to thermal runaway. The container comprises a plurality of substructures that are arranged in a layered sequence to provide the desired effect. The substructures act in concert to decouple the shock load to the main containment structure using shock decoupling with energy dissipation and attenuation technology, having a highly deformable polymer structure, and managed venting. In thermally dominated events, such as a runaway LI battery fire, a crushable medium present in one or more layers of the container presents a significant thermal barrier and contains the fire.

19 Claims, 15 Drawing Sheets

(51) Int. Cl.
  *B32B 5/24* (2006.01)
  *B32B 15/04* (2006.01)
  *B32B 15/20* (2006.01)
  *B32B 17/06* (2006.01)
  *B32B 27/40* (2006.01)
  *B65D 85/00* (2006.01)

(52) U.S. Cl.
  CPC ............ *B32B 15/20* (2013.01); *B32B 17/061* (2013.01); *B32B 27/40* (2013.01); *B65D 85/54* (2013.01); *B32B 2250/04* (2013.01); *B32B 2262/101* (2013.01); *B32B 2305/022* (2013.01); *B32B 2307/536* (2013.01); *B32B 2307/72* (2013.01)

(58) Field of Classification Search
  USPC ........................................................ 220/88.1
  See application file for complete search history.

(56) References Cited

U.S. PATENT DOCUMENTS

| | | | | |
|---|---|---|---|---|
| 6,686,003 | B2* | 2/2004 | Legare | E05G 1/024 |
| | | | | 428/920 |
| 6,752,092 | B2* | 6/2004 | Beattie | E05G 1/005 |
| | | | | 109/74 |
| 7,916,487 | B2* | 3/2011 | Bitton | G11B 33/1406 |
| | | | | 361/679.02 |
| 8,887,515 | B2* | 11/2014 | Patstone | F25D 11/003 |
| | | | | 62/530 |
| 11,873,152 | B2* | 1/2024 | Kagimoto | F25D 23/06 |
| 2010/0270318 | A1* | 10/2010 | Dagher | B65D 90/08 |
| | | | | 220/660 |
| 2011/0089173 | A1* | 4/2011 | Patel | B65D 1/0215 |
| | | | | 427/508 |
| 2011/0174509 | A1* | 7/2011 | Quante | B32B 15/046 |
| | | | | 428/317.1 |
| 2012/0180707 | A1* | 7/2012 | DelloRusso, Jr. | E05G 1/024 |
| | | | | 109/64 |
| 2016/0251138 | A1* | 9/2016 | Friedrich | G21F 5/12 |
| | | | | 220/560.01 |
| 2018/0356195 | A1* | 12/2018 | McNelis | F42B 39/14 |
| 2019/0137037 | A1* | 5/2019 | Gehlhausen | F17C 13/004 |
| 2022/0319727 | A1* | 10/2022 | Babayants | G21F 5/08 |

* cited by examiner

DEVICES AND METHODS FOR BLAST CONTAINMENT

RELATED APPLICATION

This application claims the benefit of U.S. Prov. Pat. App. No. 63/235,646, filed on Aug. 20, 2021, which is incorporated by reference as if set forth fully herein.

BACKGROUND OF THE DISCLOSURE

Field of the Disclosure

The disclosure relates to devices and methods for containing or diminishing high energy events, such as explosions or blasts, and, more specifically, to compact containers for containing or diminishing these events.

Description of Related Art

Options of devices and methods presently available for blast containment typically involve a simple high-strength boxes and/or materials. Some of the more complex blast mitigation devices and methods use flow properties (e.g., internal inertia, and surface tension) to scatter pressure conditions. However, the related art concerning blast mitigation and/or containment can be improved upon by utilizing wave mitigation, heat attenuation, and energy management.

BRIEF DESCRIPTION OF THE DRAWINGS

These and other further features and advantages of the disclosure would be apparent to those skilled in the art from the following detailed description, taken together with the accompanying drawings, where like numerals designate corresponding parts in figures, in which.

DETAILED DESCRIPTION OF THE DISCLOSURE

Figure 1:
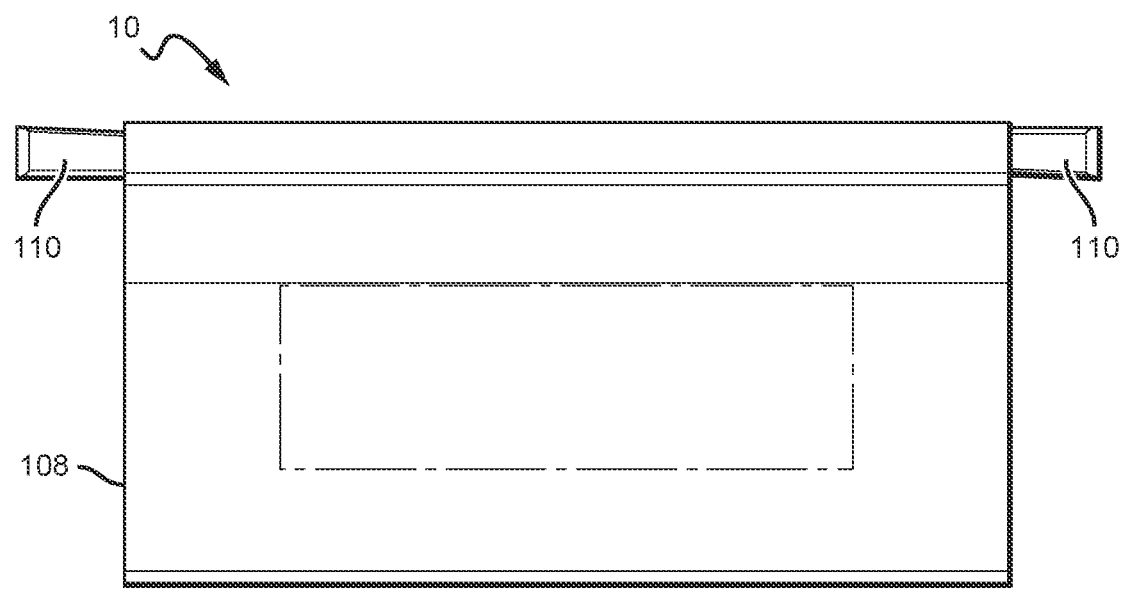
FIG. 1 is a side elevation view of the containment system 10.

Throughout this disclosure, the embodiments illustrated should be considered as exemplars, rather than as limitations on the present disclosure. As used herein, the term "composition," "device," "structure," "method," "disclosure," "present composition," "present device," "present structure," "present method," or "present disclosure" refers to any one of the embodiments of the disclosure described herein, and any equivalents. Furthermore, reference to various feature(s) of the "composition," "device," "structure," "method," "disclosure," "present composition," "present device," "present apparatus," "present method," or "present disclosure" throughout this document does not mean that all claimed embodiments or methods must include the reference feature(s).

It is also understood that when an element or feature is referred to as being "on" or "adjacent" to another element or feature, it can be directly on or adjacent the other element or feature or intervening elements or features may also be present. In contrast, when an element is referred to as being "directly on" or extending "directly onto" another element, there are no intervening elements present. Additionally, it is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Furthermore, relative terms such as "inner," "outer," "upper," "top," "above," "lower," "bottom," "beneath," "below," and similar terms, may be used herein to describe a relationship of one element to another. Terms such as "higher," "lower," "wider," "narrower," and similar terms, may be used herein to describe angular relationships. It is understood that these terms are intended to encompass different orientations of the elements or system in addition to the orientation depicted in the figures.

Although the terms first, second, third, etc., may be used herein to describe various elements, components, regions, and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present disclosure. As used herein, the term "and/or" includes any and all combinations of one or more of the associated list items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. For example, when the present specification refers to "an" assembly, it is understood that this language encompasses a single assembly or a plurality or array of assemblies. It is further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments as described in the present disclosure can be described herein with reference to view illustrations that are schematic in nature. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region and are not intended to limit the scope of the disclosure.

Embodiments of the present disclosure include containers designed to contain and/or mitigate high energy events such as blasts from explosions or thermal runaways. The containers include a body that is built to define an interior chamber that is shaped to receive an explosive device such as a pipe bomb or another kind of improvised explosive device (IED) or an electronic device susceptible to thermal runaway, such as a device with lithium-ion (LI) batteries, for example. The container comprises a plurality of substructures that are arranged in a layered sequence to provide the desired effect. The substructures act in concert to decouple the shock load to the main containment structure using shock decoupling with energy dissipation and attenuation technology, having a highly deformable polymer structure, and managed venting. In thermally dominated events, such as a runaway LI battery fire, a crushable medium present in one or more layers of the container presents a significant thermal barrier and contains the fire.

Figure 2:
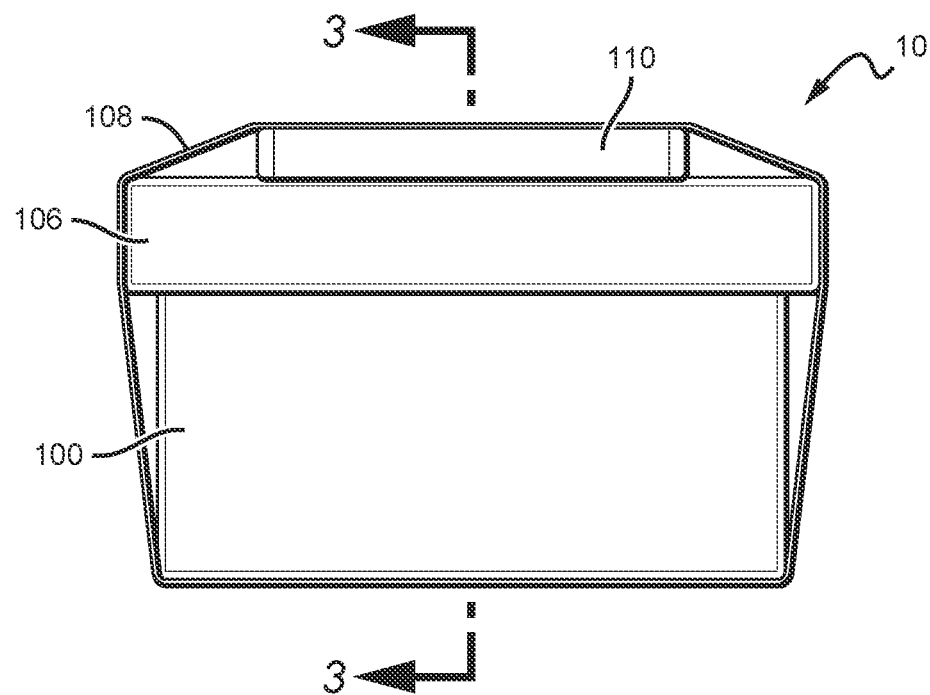
FIG. 2 is an end elevation view of the containment system 10.

In one embodiment, a compact containment system 10 is used to mitigate the high energy event (e.g., an explosion, a thermal runaway, etc.). FIG. 1 shows a side view of the containment system 10. FIG. 2 shows an end view of the containment system 10. It is understood that containment systems having different sizes can be used, and the various components and layers that compose the containment system may also be sized differently than those shown. The size of the containment system may be dictated by the intended application. For example, the containment system 10 may be sized such that it is well-suited for use in a common carrier, such as an airliner, for example. This disclosure describes the containment system 10 in detail, but it will be understood by those of skill in the art, that the principles that dictate the performance of the containment system 10 apply to containment systems of other sizes that are designed for different applications.

Figure 3:
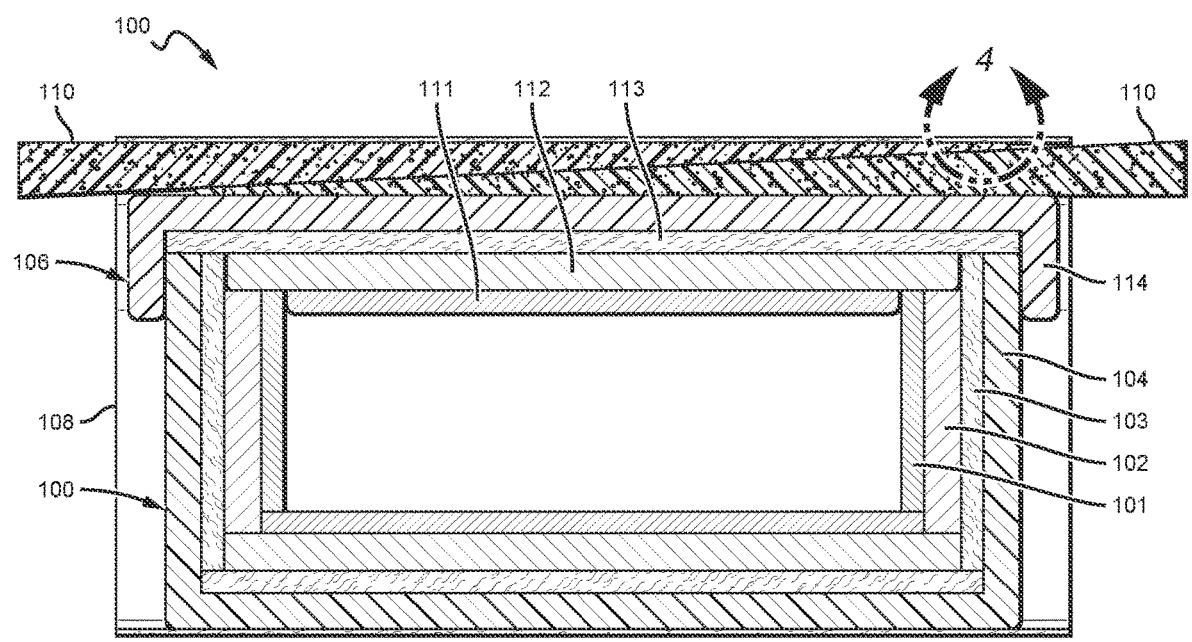
FIG. 3 is a cross-sectional view of the containment system 10 along section line B-B.

FIG. 3 shows a cross-sectional view of the containment system 10 along section line B-B. This particular embodiment comprises a container 100 with several layers of material arranged in an ordered sequence starting from the innermost layer and progressing outwards to the exterior. Thus, the innermost layer is termed as the first layer with the ordinal-termed layers ascending as the layers get farther away from the interior.

In this particular embodiment, the first layer 101 comprises an aluminum foam having a suitable density, such as approximately 0.5 g/cm$^3$, for example. This layer 102 may be formed using a pressed powder/foaming agent method and is foamed to shape in a mold tool heated in a furnace. Other suitable materials which mitigate shock transmission, have suitable density, and dissipate energy via non-recoverable work may also be used. Some such materials are, for example, foam titanium, foam copper, or closed-cell polymer foams.

In this particular embodiment, the second layer 102 comprises pressed inert powder. This layer should have a very high thermal breakdown temperature and is designed to break down into smaller particles to dose a fireball and should also have a different density from the first layer 101. Upon impact of a fireball, the second layer 102 initially compacts irrecoverably and then shatters into micron-sized particulate which will operate to remove energy in the form of heat from the fireball and store it in a solid medium (the second layer 102) that is not going to exert as much load onto the container 100 as would a heated fluid, i.e., the gas inside the container 100. The micron-sized particulate will then become entrained in the fireball which works to remove heat energy from the fireball and reduce pressure on the container 100.

As previously stated, suitable materials for the second layer 102 should mitigate shock and hold heat from a fireball in a solid state. One suitable material for this layer 102 is $SiO_2$ with glass wool fibers added therein. Some other exemplary suitable materials for the second layer 102 are: aerogels; cement-based fiber board; drywall; pressed alkali metal compounds (e.g., calcium carbonate, sodium bicarbonate, sodium carbonate); closed-cell polyurethane foam; pumice; vermiculite; perlite; and pressed low-melting-point glass beads. Other materials may also be used.

In this particular embodiment, the third layer 103 comprises an E-glass, which is alumino-borosilicate glass with less than 1% w/w alkali oxides, mainly used for glass-reinforced plastics. The fiber/resin content and thickness of this layer 103 are determined based on the anticipated threat level. During a high energy event, the third layer 103 distributes the available load across the entire face of the third layer 103 which has the effect of slowing down the response time of the structural components of the container 100 to prevent them from breaking. The third layer 103 also has a different density than the first and second layers, 101, 102. The density differential from layer to layer is intended to increase the time it takes for the system to reach a steady-state equilibrium, allowing the container components more time to react structurally.

As previously stated, one suitable material for the third layer 103 is an E-glass. Other exemplary suitable materials include: aramid fiber composites (e.g., Kevlar™ or Twaron™); carbon fiber; aluminum; titanium; and steel. Other materials are also possible.

In this particular embodiment, the fourth layer 104 comprises a polyurethane (PU). In some embodiments, the material selected should have a 300-400% strain-to-failure criteria and a Shore hardness between 50D and 60A. This range allows for different responses depending on anticipated operating temperature range. Deployment in high-temperature environments would require a higher hardness at room temperature to allow for viscosity drop at higher temperatures. The thickness of the fourth layer 104 may be determined by anticipated threat level. During a high energy event the fourth layer should be able to expand to a multiple (e.g., 2-3 times) its initial volume. This expansion works to remove energy from the fireball inside the container 100 so that when the fireball is released from the containment system 10 minimal damage occurs to outside structures.

As previously stated, one suitable material for the fourth layer 104 is polyurethane. Other exemplary suitable materials include: aramid fiber composites (e.g., Kevlar™ and Twaron™); polyethylene fiber composites (e.g., Dyneema™ or Spectra™); pressed polyethylene; and polybenzoisooxazole fiber composites (e.g., Zylon™). Other materials may also be used.

In one embodiment, the top of the container 100 is open to provide access to the interior chamber and allow for the placement of an explosive device (ED) therein when the container 100 is in an unassembled state. To put the container 100 in an assembled state, the opening can be covered with a lid 106 which may comprise at least one of the layers that compose the other sides of the container 100. For example, in the embodiment shown in FIG. 3, the lid 106 comprises a series of layers 111, 112, 113, 114 which correspond with the layers 101, 102, 103, 104 of the container 100 to create a series of enclosures of the same material.

Figure 5:
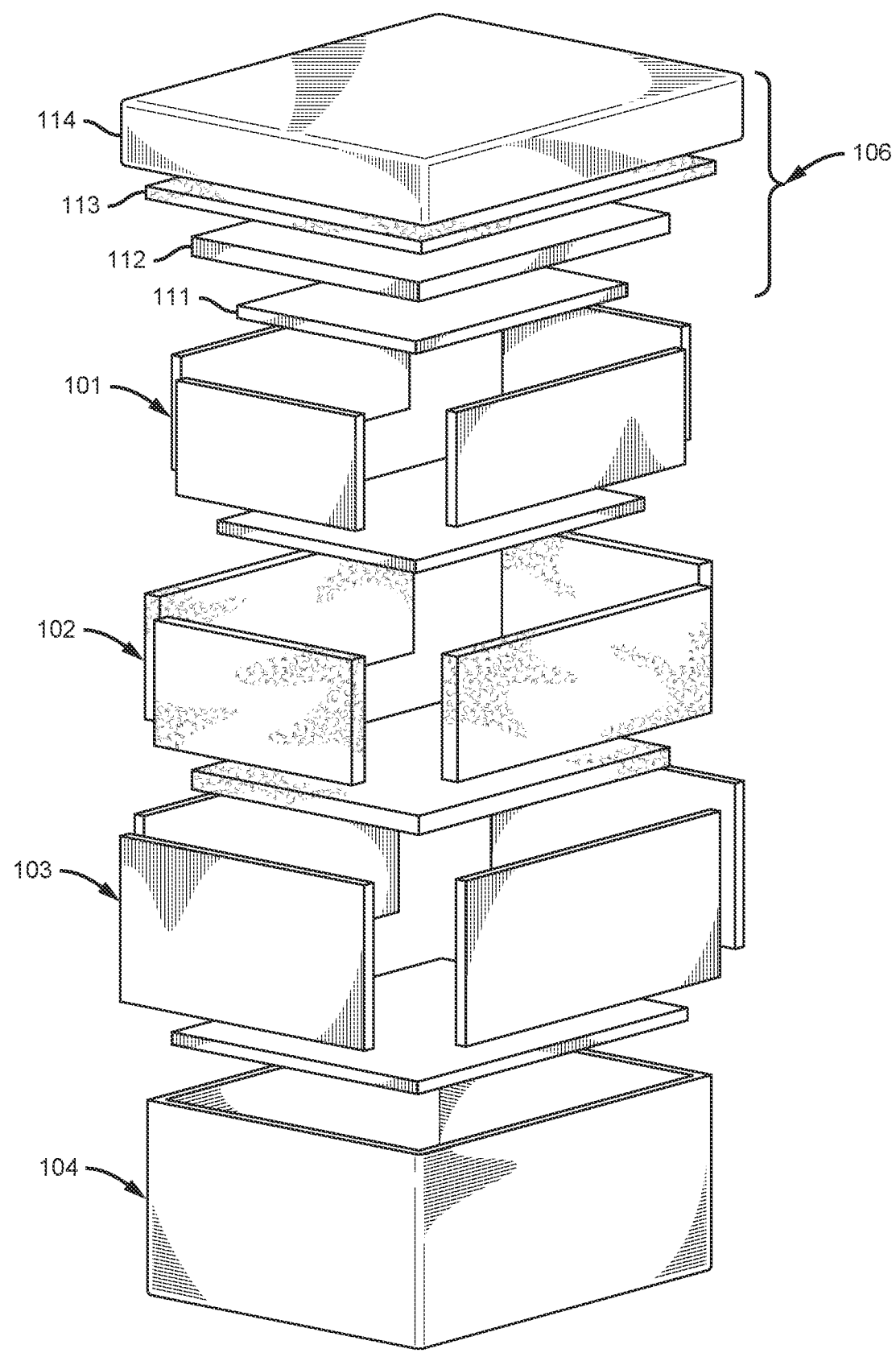
FIG. 5 is an exploded view of the container 100.

FIG. 5 is an exploded view of the container 100 and the lid 106. The container comprises the layers 101, 102, 103, 104 arranged in a nested configuration. The lid 106 comprises the corresponding lid layers 111, 112, 113, 114.

Figure 6:
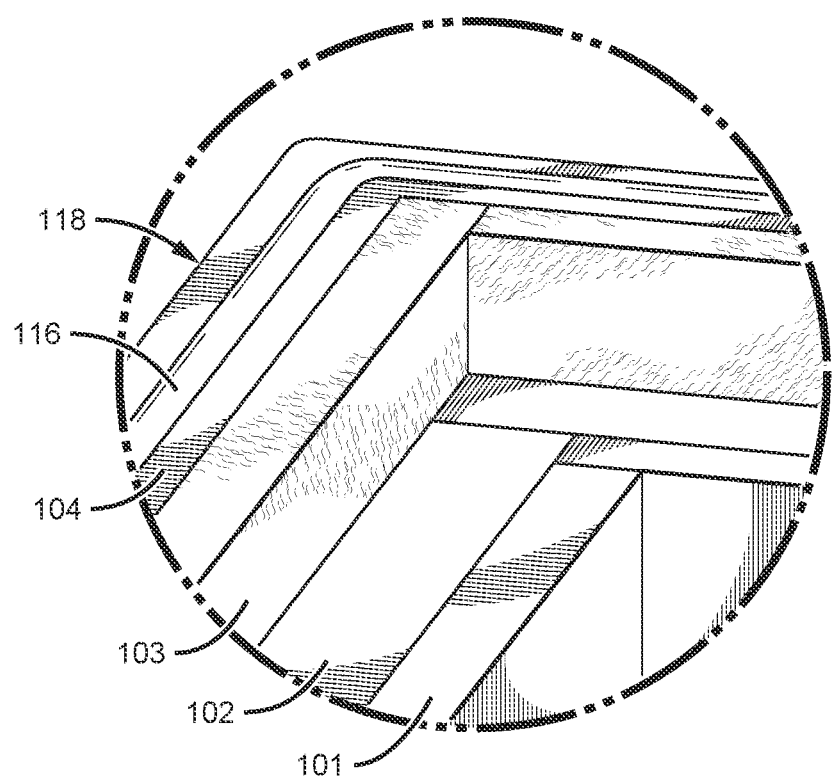
FIG. 6 is a close-up of a corner portion of the container 100.

FIG. 6 is a close-up of a corner portion of the container 100. The lid layers 111, 112, 113, 114 are sized such that the lid can fit snugly onto the container as best shown in FIGS. 5 and 6. In this particular embodiment, the top surfaces of the first and second container layers 101, 102 are flush such that when the lid 106 and the container 100 are assembled, the lid layer 111 sits within the perimeter of the first layer 101 with the lid layer 112 sitting atop the first and second layers 101, 102. Similarly, the top surfaces of the third and fourth container layers 103, 104 are flush such that when the lid 106 and the container 100 are assembled, the lid layer 113 sits within the perimeter of the third layer 103 with the lid layer 114 sitting atop the third and fourth layers 103, 104.

Figure 16:
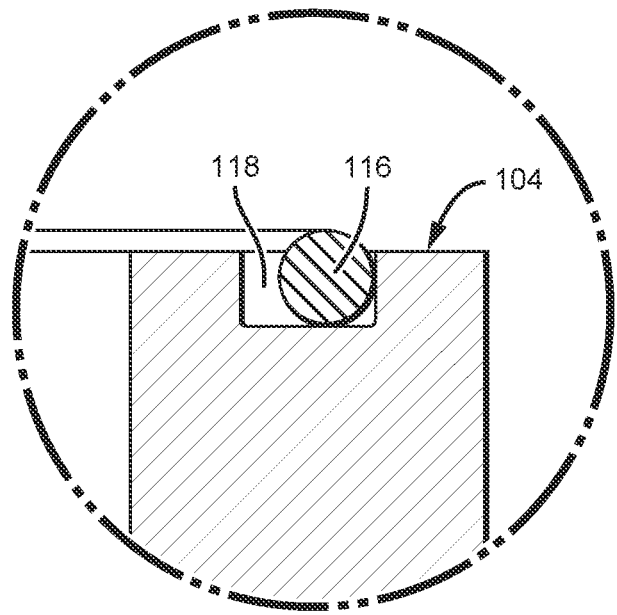
FIG. 16 is a close-up view of a corner portion of the fourth layer 104 including the uncompressed gasket 116 which is seated in the groove 118.

In this embodiment, a gasket 116 is included in a dugout groove 118 in the top surface of the fourth layer 104 as best shown in FIGS. 6 and 16. The groove 118 is sized to receive the gasket 116 such that when the lid 106 is placed on the container 100, the gasket 116 is compressed and substantially fills the groove 118 to provide a seal that prevents hot gas and particulate from escaping the container 100 during a high energy event.

Figure 7:
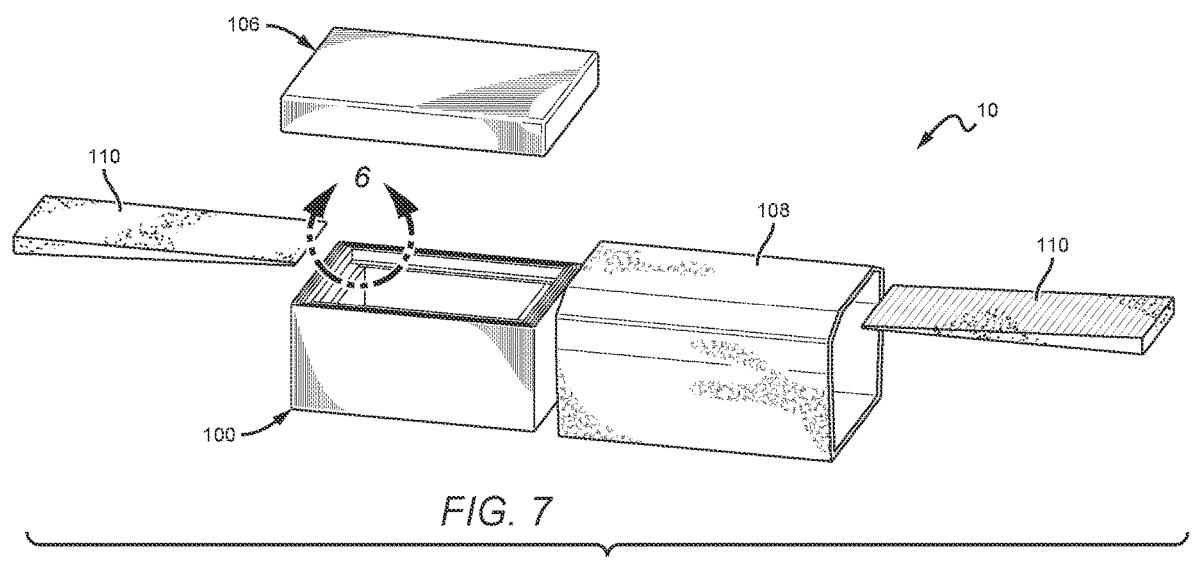
FIG. 7 is an exploded view an embodiment of the system in a disassembled state.
Figure 8:
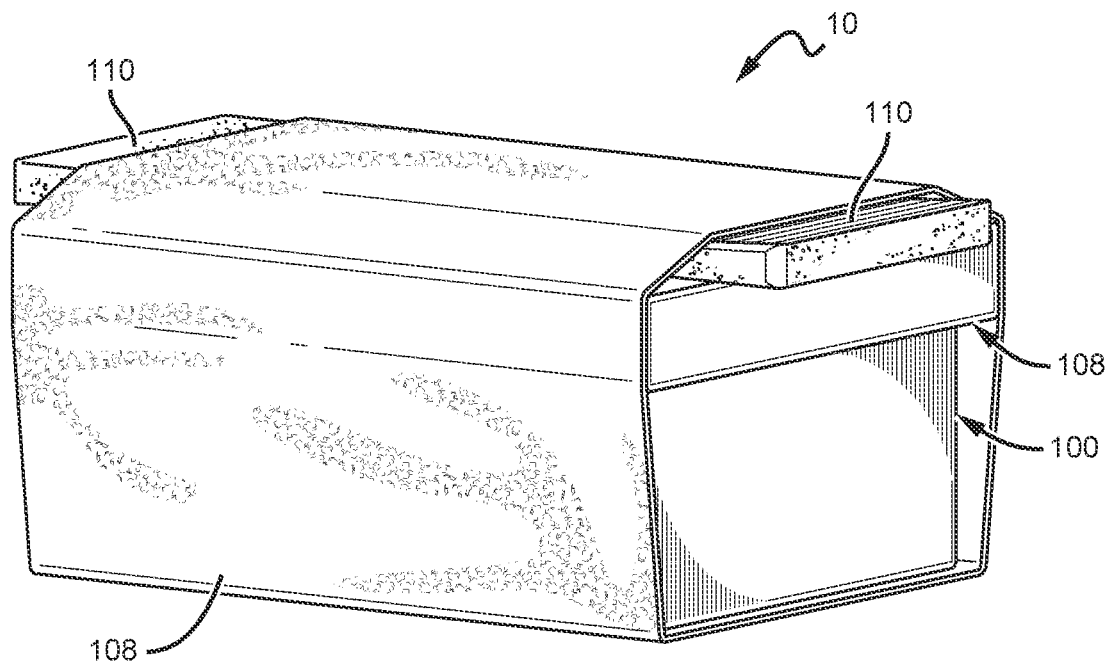
FIG. 8 is a perspective view of the containment system in an assembled state.

FIG. 7 is an exploded view an embodiment of the system in a disassembled state. FIG. 8 shows the system in an assembled state, ready for use. The lid 106 may be fastened to the container 100 using various mechanical fasteners, or it can be press-fit onto the container and held together with an external structure such as a fabric sleeve. In one such embodiment, when assembled the container 100 and the lid 106 can be inserted into a sleeve 108 (as shown in FIGS. 7 and 8). When a high energy event is anticipated, the source can be placed in the container 100 which can be secured within the sleeve 108 using two opposing wedges 110 that may be slid between the lid and the sleeve as discussed in more detail herein. Because the sleeve 108 is sized to leave some space around the container 100 when inserted, the container 100 may be quickly inserted into the sleeve 108 by a user and then secured by inserting the wedges 110 between the top surface of the container 100 and the sleeve 108 from opposite ends. During a high energy event, as the lid 106 is urged off of the container 100, the wedges 110 will initially resist and then will be crushed into a powder and dissipated, taking kinetic energy away from the container 100 so that the load is applied more slowly to the sleeve 108.

Figure 4:
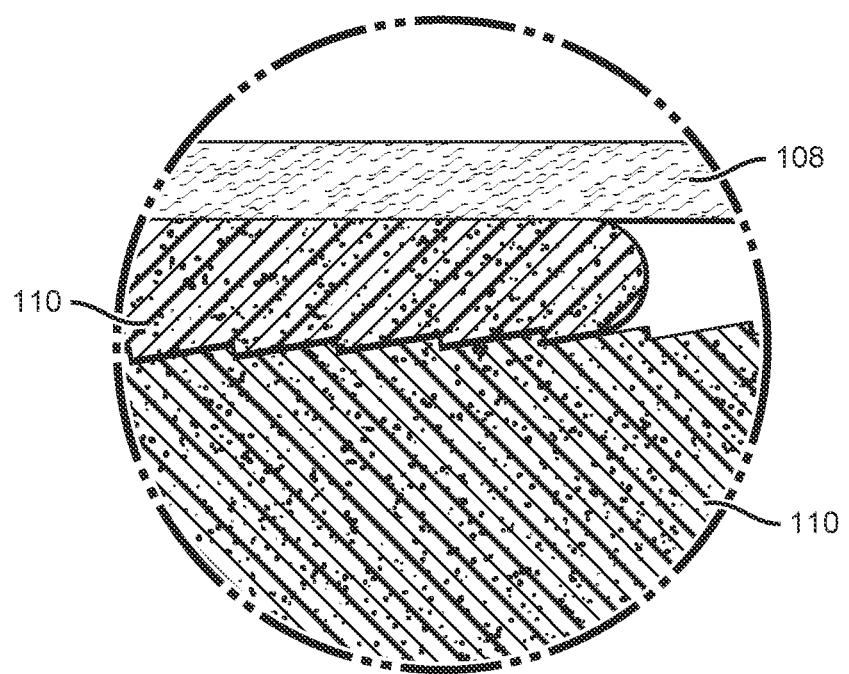
FIG. 4 is a close-up view of a portion of the container 100.

FIG. 4 is a close-up view of a portion of the container 100 showing the wedges 110. In some embodiments, the wedges 110 may be ridged as shown to prevent back-out during a high energy event. However, in other embodiments the ridges will be unnecessary as the wedges 110 will bend upward during a high energy event and the deformation itself will prevent back-out.

One suitable material for the wedges 110 is a stiff polymer foam, e.g., a closed-cell polyurethane elastomer. Other suitable materials include, for example, aluminum or carbon fiber.

Some suitable materials for the sleeve 108 include, for example, Kevlar®, Dyneema®, and woven aluminum. The allowable strain of the sleeve 108 determines the rate at which the container vents during a high energy event.

Figure 9:
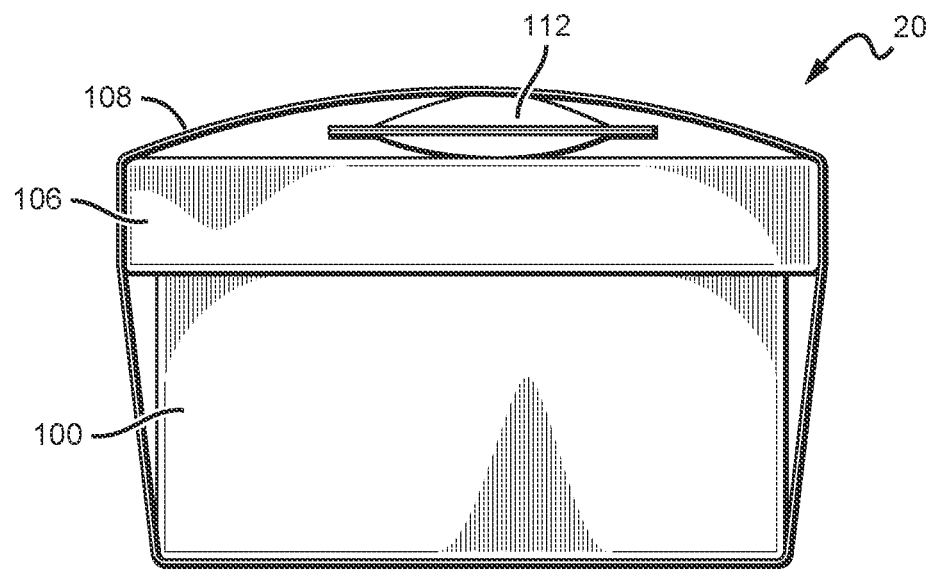
FIG. 9 is an elevation view of end of another embodiment of a containment system 20.

FIG. 9 is an elevation view of end of another embodiment of a containment system 20. In this particular embodiment, a bladder 112 that may be rapidly filled with an inert gas such as $CO_2$ may be placed between the lid 106 and the sleeve, so that when the bladder 112 is inflated the lid 106 is pressed snuggly against the container 100. Other mechanisms may also be used to seal the lid 106 over the container 100.

Figure 10:
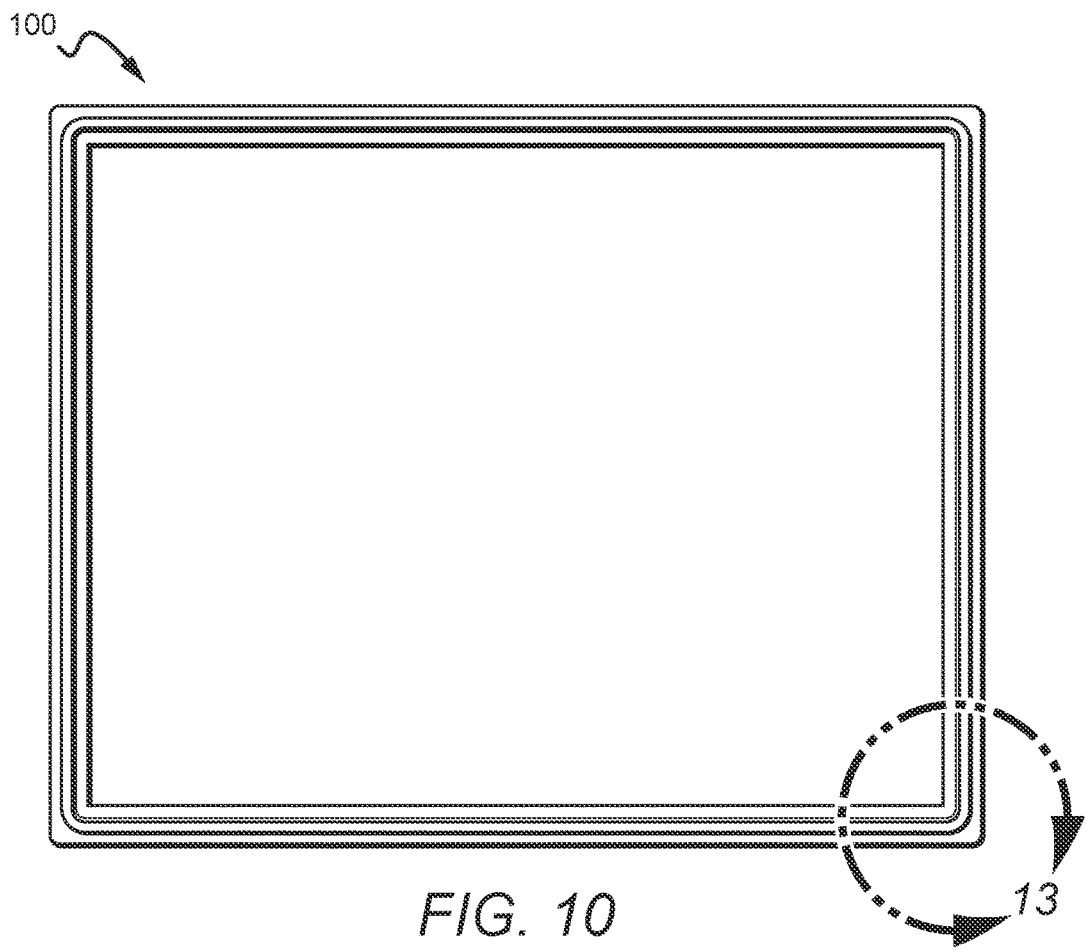
FIG. 10 is a top plan view of the container 100.

FIG. 10 is a top plan view of the container 100.

Figure 11:
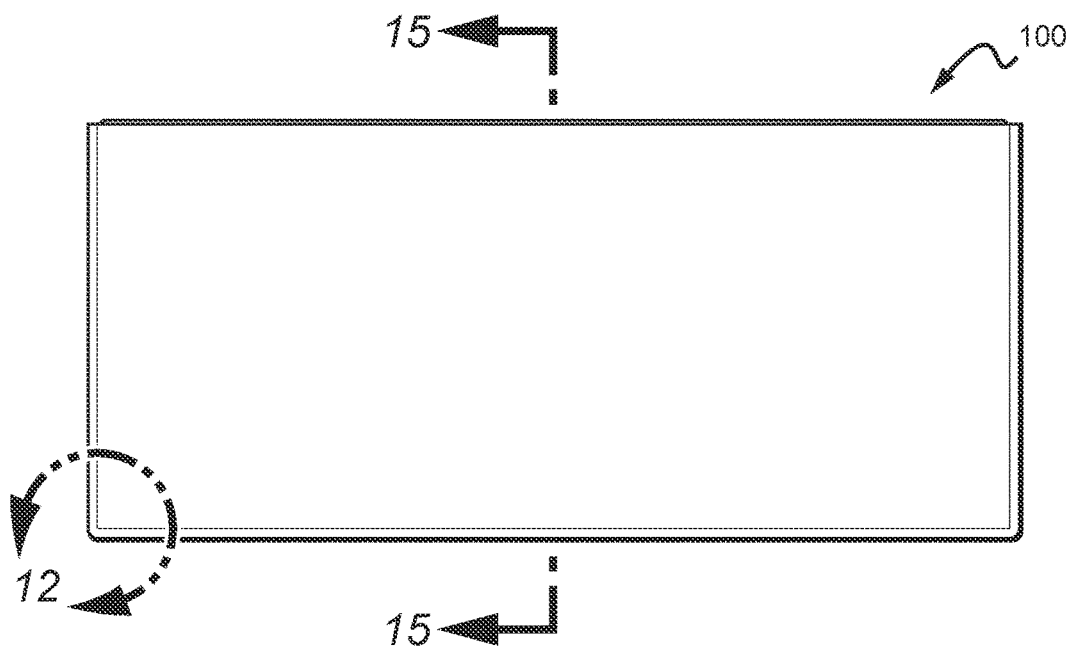
FIG. 11 is a side elevation view of the container 100.

FIG. 11 is a side elevation view of the container 100.

Figure 12:
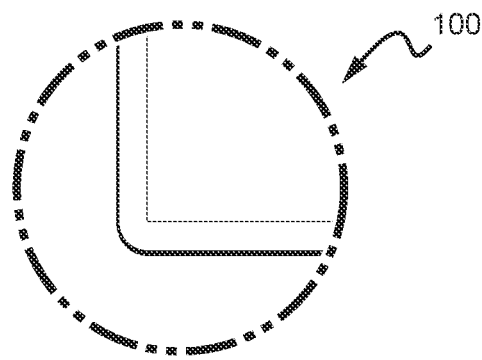
FIG. 12 is a close-up view of a side corner portion of the container 100.

FIG. 12 is a close-up view of a side corner portion of the container 100.

Figure 13:
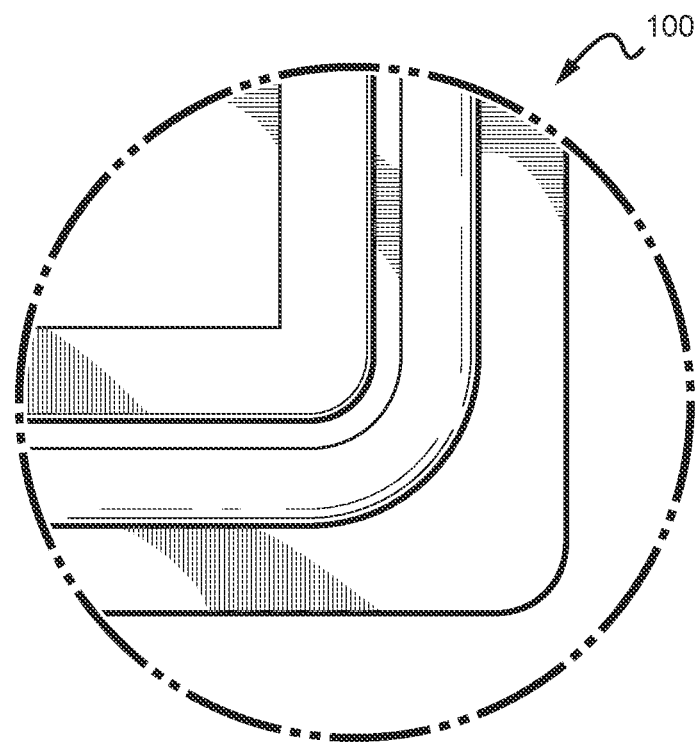
FIG. 13 is a close-up view of a top corner portion of the container 100.

FIG. 13 is a close-up view of a top corner portion of the container 100.

Figure 14:
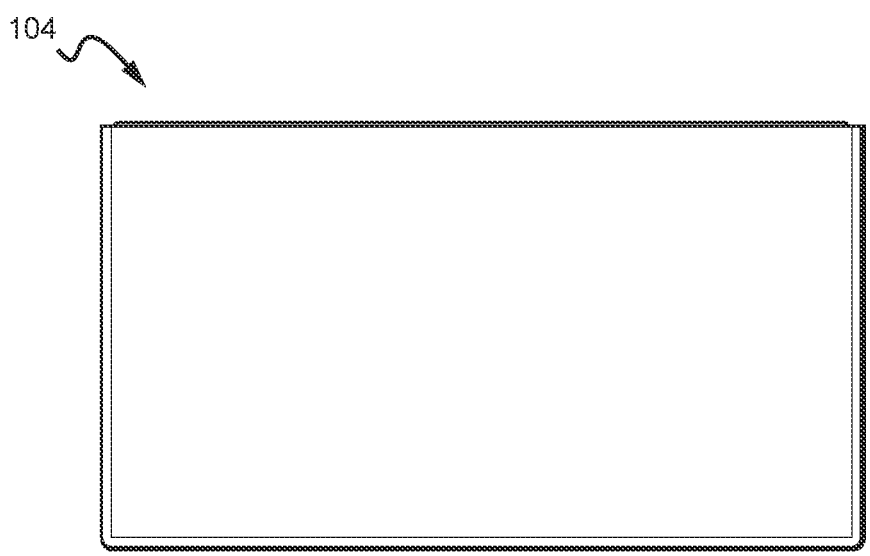
FIG. 14 is an elevation view of an end portion of fourth layer 104 of the container 100.

FIG. 14 is an elevation view of an end portion of fourth layer 104 of the container 100.

Figure 15:
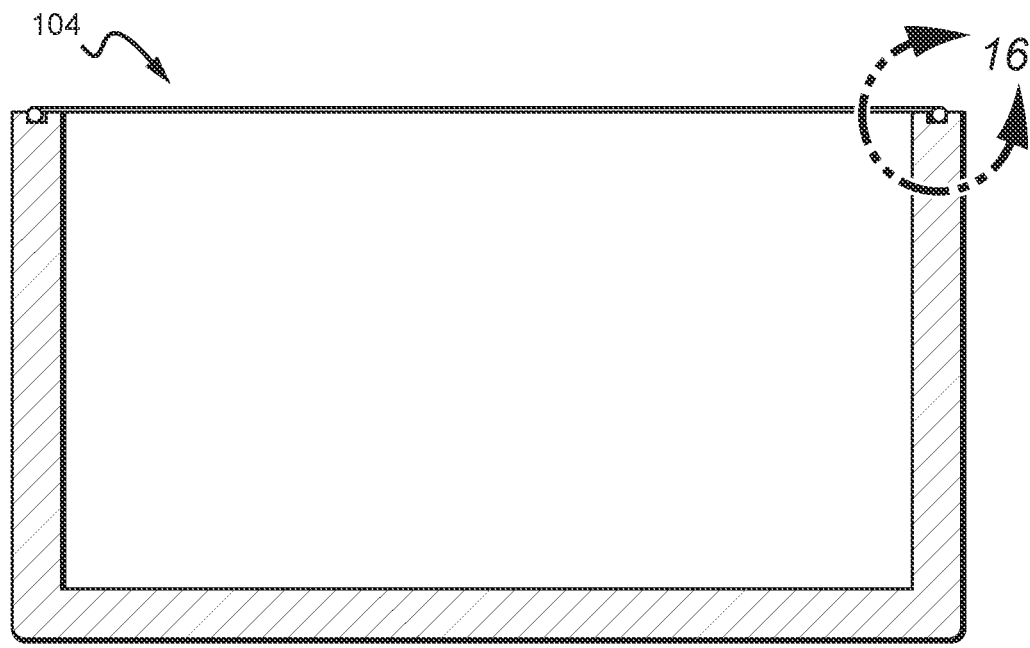
FIG. 15 is a sectional view of the fourth layer 104 of the container 100 taken along section line G-G.

FIG. 15 is a sectional view of the fourth layer 104 of the container 100 taken along section line G-G.

FIG. 16 is a close-up view of a corner portion of the fourth layer 104 including the uncompressed gasket 116 which is seated in the groove 118.

Figure 17A:
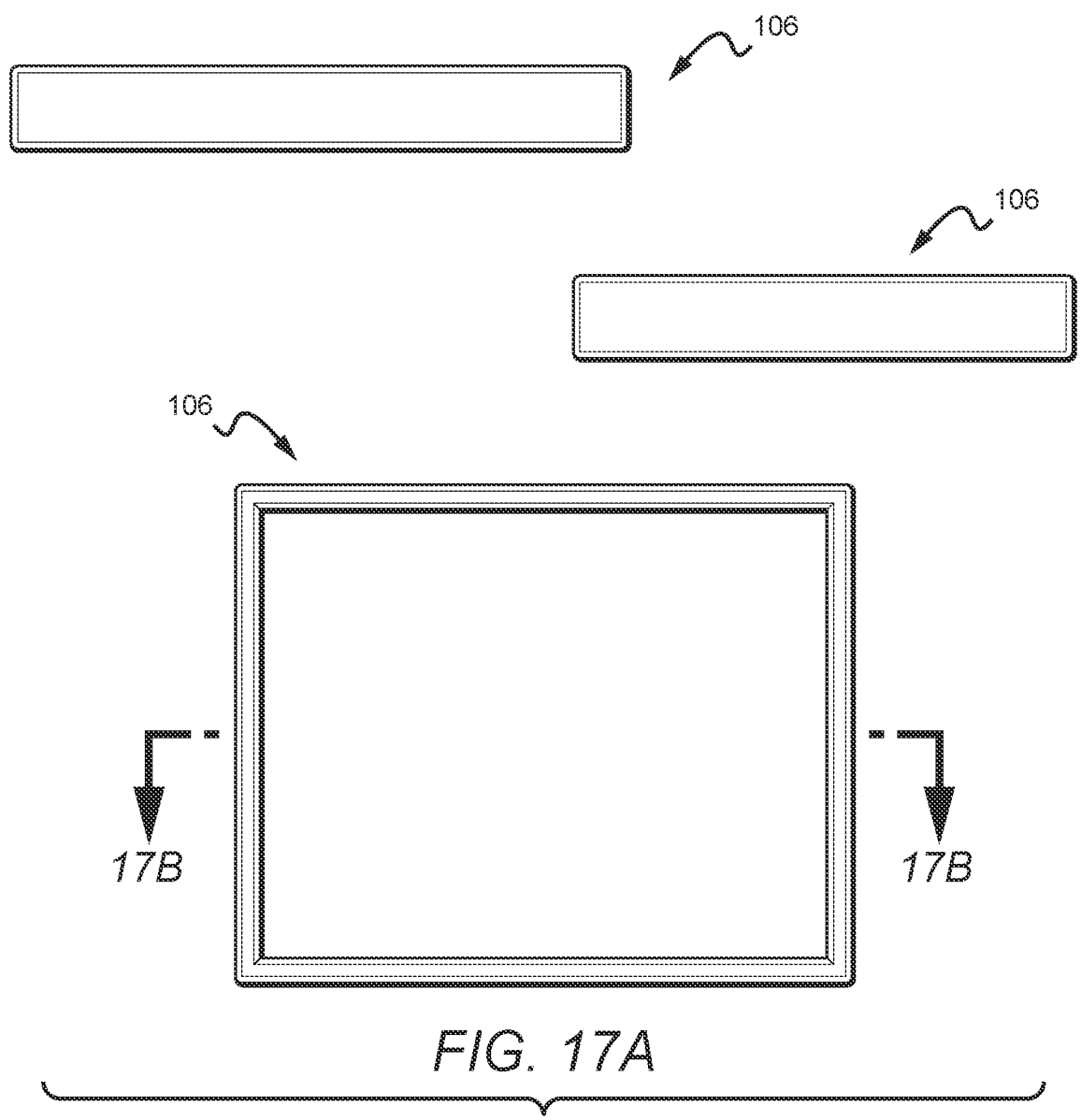
FIG. 17A shows various elevation views of the lid 106 from different angles.
Figure 17B:
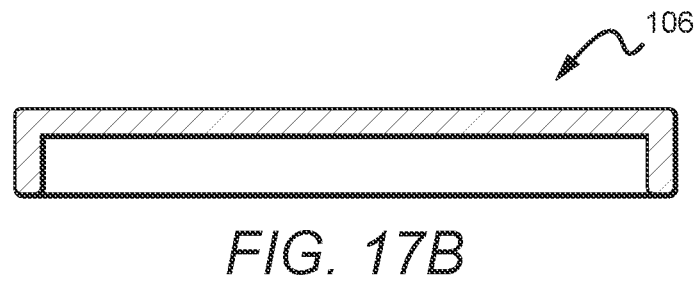
FIG. 17B is a cross-sectional view of the lid 106 along section line 17B-17B from FIG. 17A.

FIG. 17A shows various views of the lid 106. FIG. 17B shows a cross-sectional view of the lid 106 along section line 17B-17B from FIG. 17A.

Figure 18:
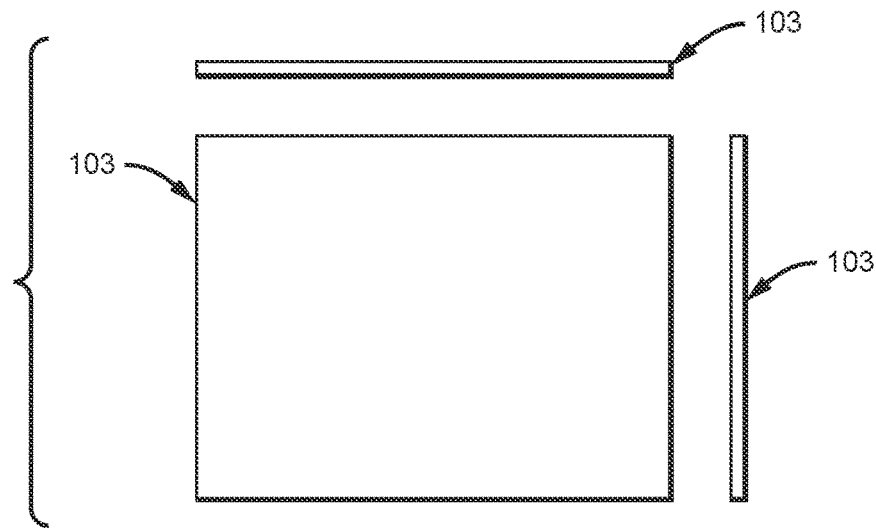
FIG. 18 shows various elevation views of the bottom portion of the third layer 103 of the container 100.

FIG. 18 shows various views of the bottom portion of the third layer 103 of the container 100.

Figure 19:
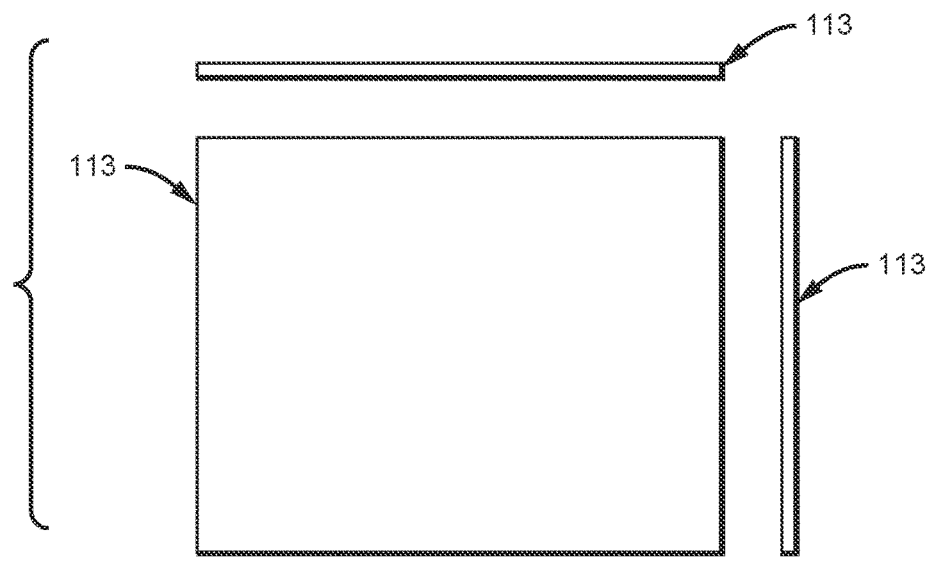
FIG. 19 shows various elevation views of the lid layer 113.

FIG. 19 shows various views of the lid layer 113.

Figure 20:
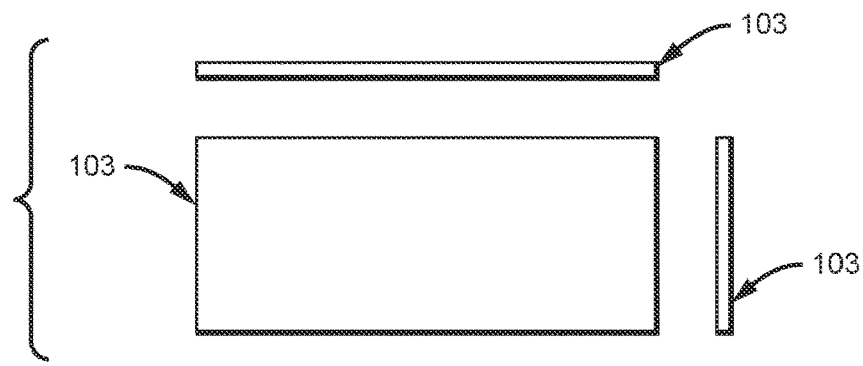
FIG. 20 shows various elevation views of a side portion of the third layer 103 along the long side of the rectangular container 100.

FIG. 20 shows various views of a side portion of the third layer 103 along the long side of the rectangular container 100.

Figure 21:
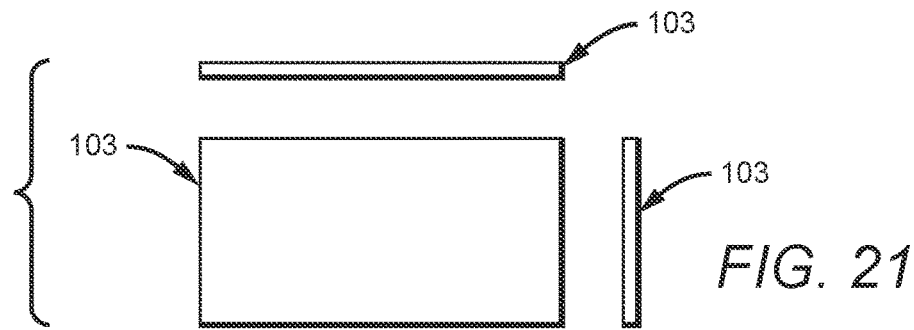
FIG. 21 shows various elevation views of an end portion of the third layer 103 along the short side of the rectangular container 100.

FIG. 21 shows various views of an end portion of the third layer 103 along the short side of the rectangular container 100.

Figure 22:
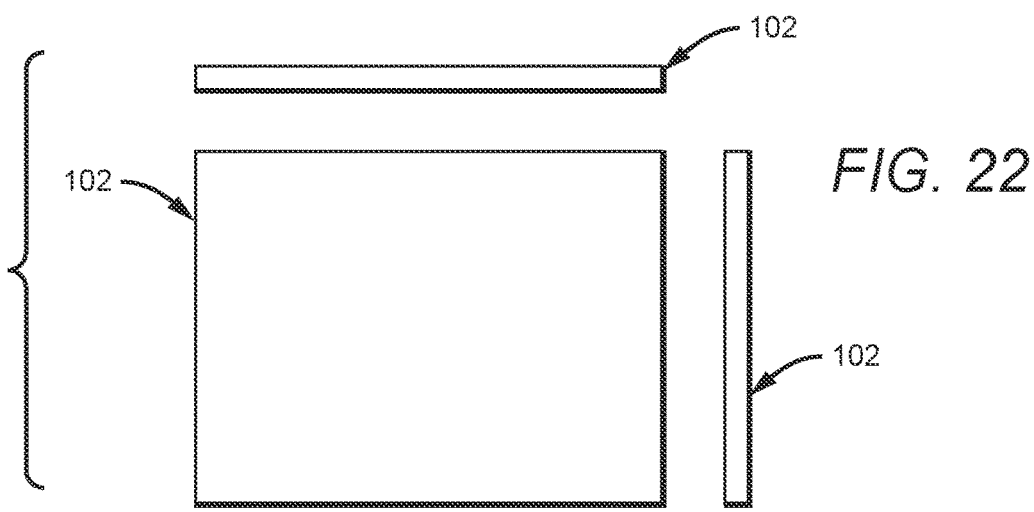
FIG. 22 shows various elevation views of the bottom portion of the second layer 102.

FIG. 22 shows various views of the bottom portion of the second layer 102.

Figure 23:
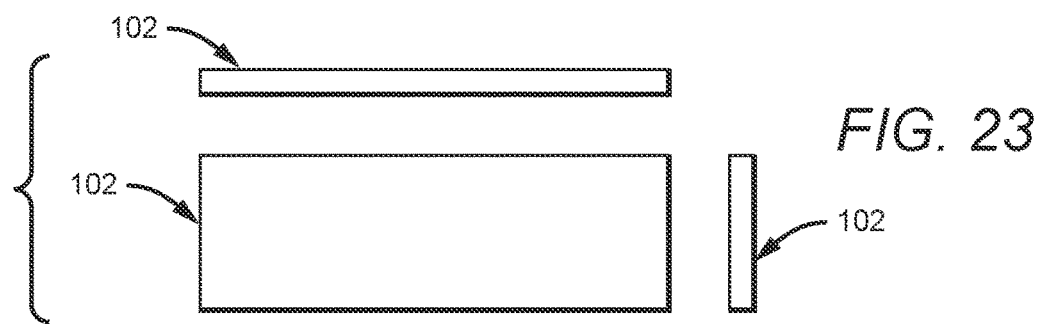
FIG. 23 shows various elevation views of a side portion of the second layer 102 along the long side of the rectangular container 100.

FIG. 23 shows various views of a side portion of the second layer 102 along the long side of the rectangular container 100.

Figure 24:
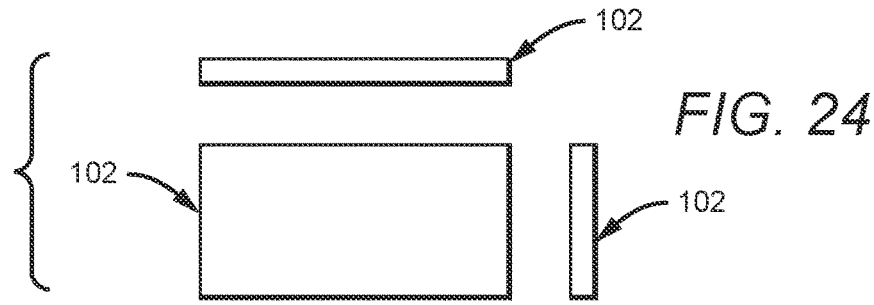
FIG. 24 shows various elevation views of an end portion of the second layer 102 along the short side of the rectangular container 100.

FIG. 24 shows various views of an end portion of the second layer 102 along the short side of the rectangular container 100.

Figure 25A:
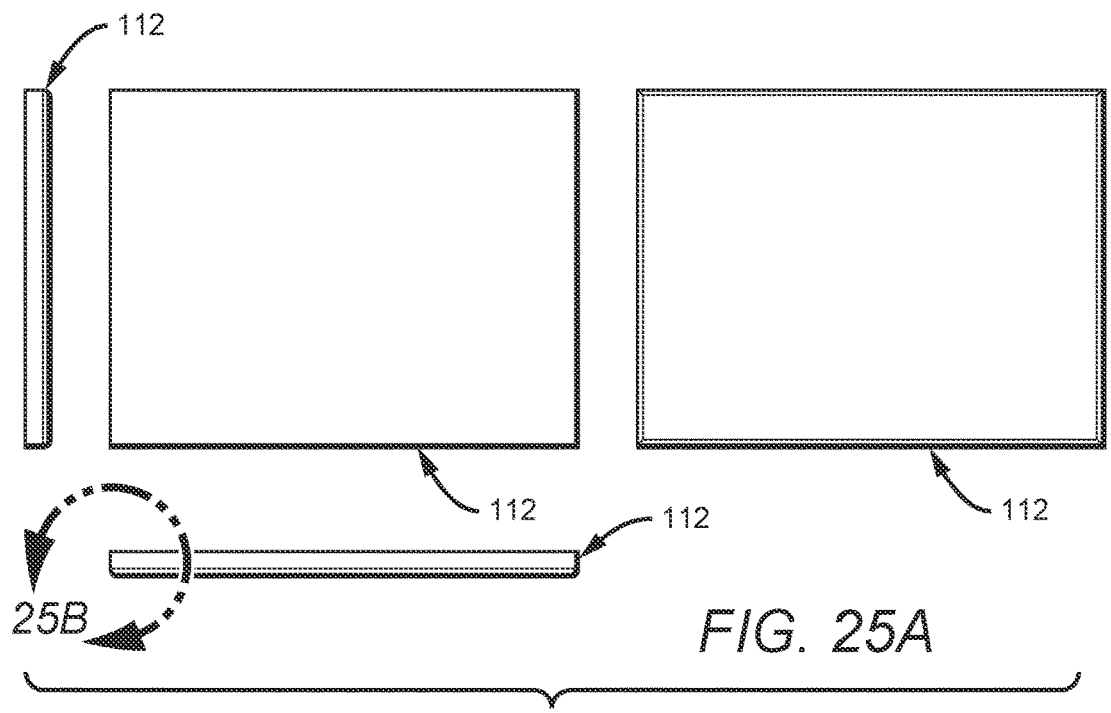
FIG. 25A shows various elevation views of the lid layer 112.
Figure 25B:
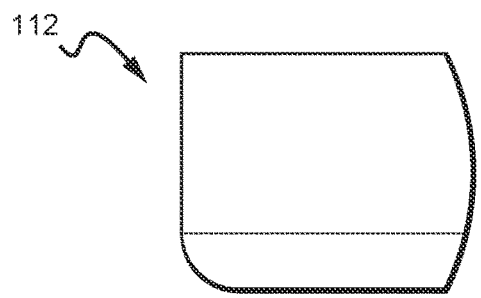
FIG. 25B is a close-up view of a corner of the lid layer 112.

FIG. 25A shows various views of the lid layer 112. FIG. 25B shows a close-up view of a corner of the lid layer 112.

Figure 26:
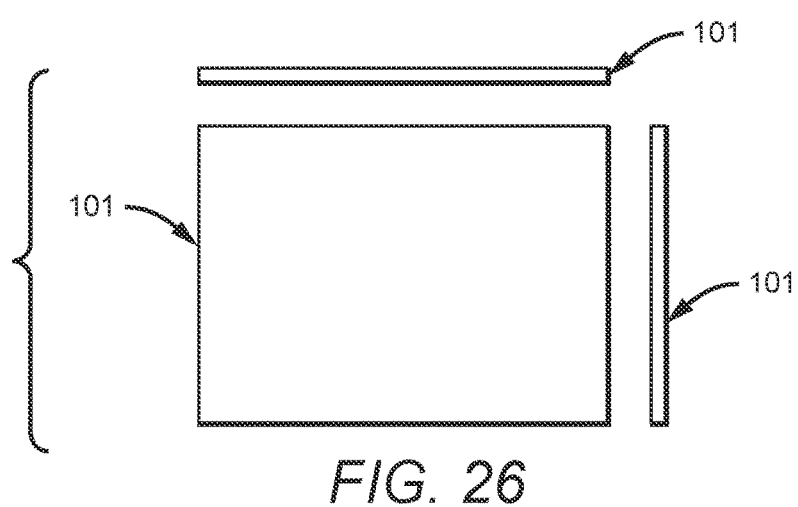
FIG. 26 shows various elevation views of the bottom portion of the first layer 101.

FIG. 26 shows various views of the bottom portion of the first layer 101.

Figure 27:
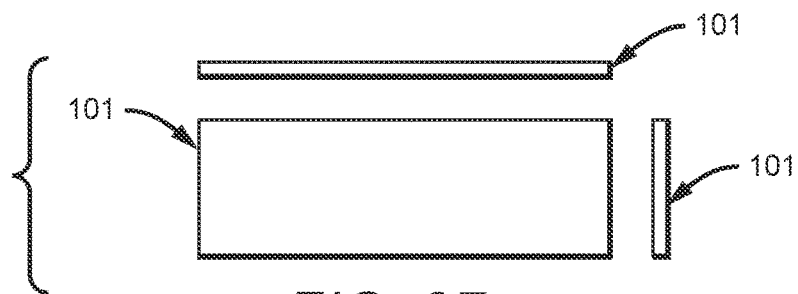
FIG. 27 shows various elevation views of a side portion of the first layer 101 along the long side of the rectangular container 100.

FIG. 27 shows various views of a side portion of the first layer 101 along the long side of the rectangular container 100.

Figure 28:
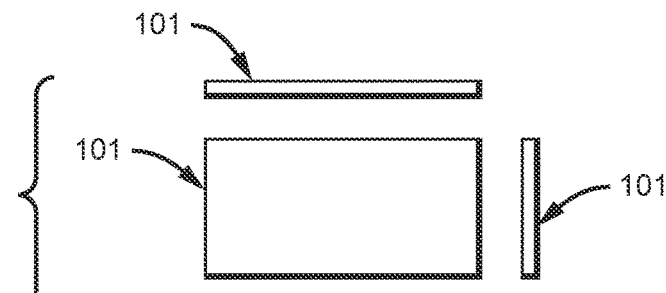
FIG. 28 shows various elevation views of an end portion of the first layer 101 along the short side of the rectangular container 100.

FIG. 28 shows various views of an end portion of the first layer 101 along the short side of the rectangular container 100.

Figure 29A:
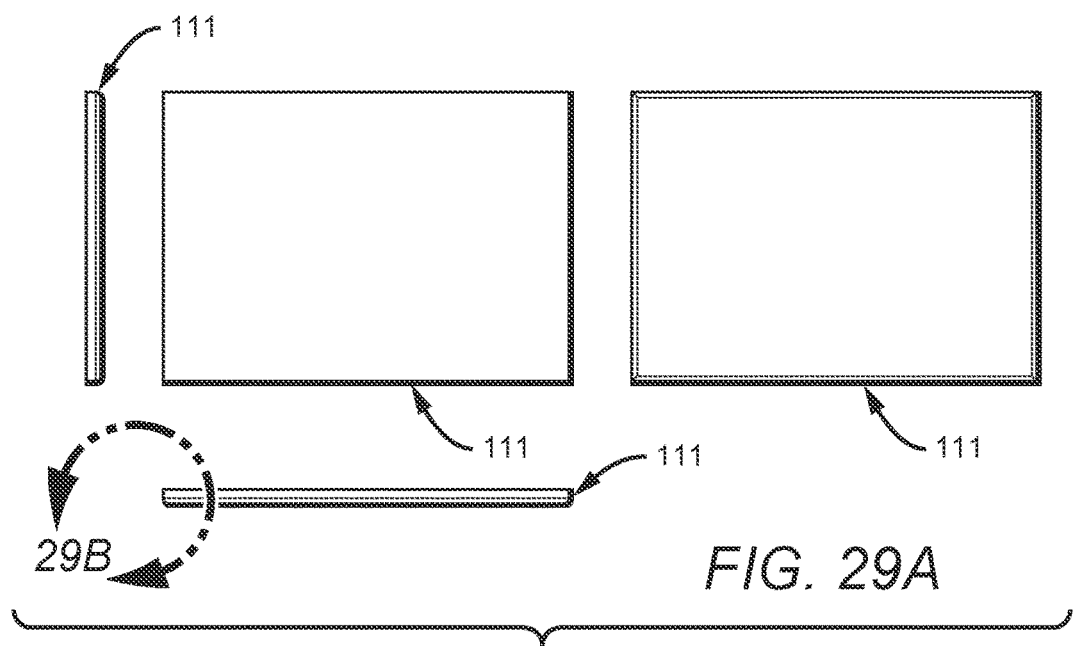
FIG. 29A shows various elevation views of the lid layer 111.
Figure 29B:
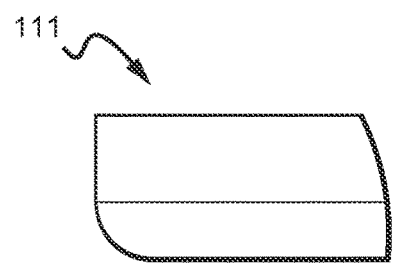
FIG. 29B shows a close-up view of a corner of the lid layer 111.

FIG. 29A shows various views of the lid layer 111. FIG. 29B shows a close-up view of a corner of the lid layer 111.

Figure 30:
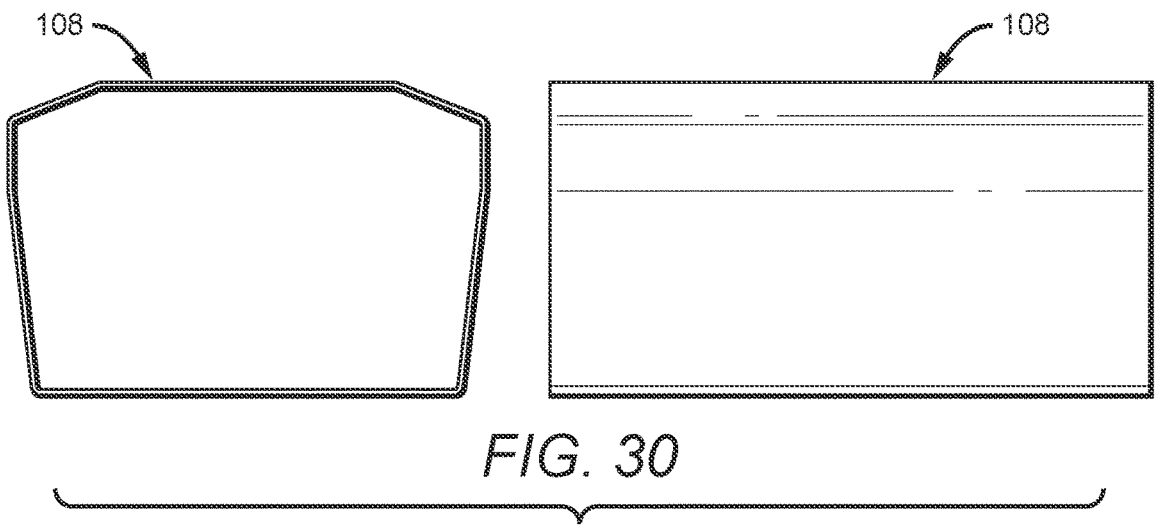
FIG. 30 shows various elevation views of the sleeve 108.

FIG. 30 shows various views of the sleeve 108.

Figure 31A:
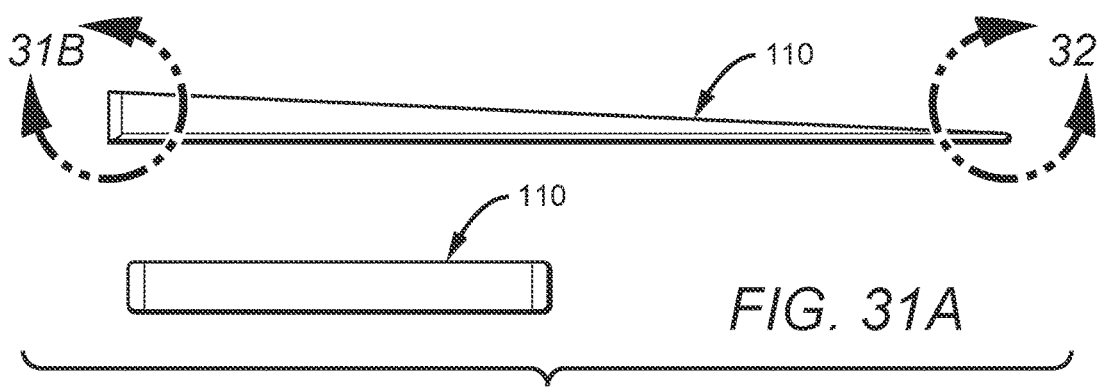
FIG. 31A shows various elevation views of one of the wedges 110.
Figure 31B:
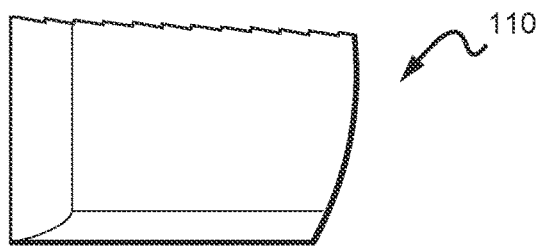
FIG. 31B shows a close-up side view of the thicker end of the wedge 110.

FIG. 31A shows various views of one of the wedges 110. FIG. 31B shows a close-up side view of the thicker end of the wedge 110.

Figure 32:
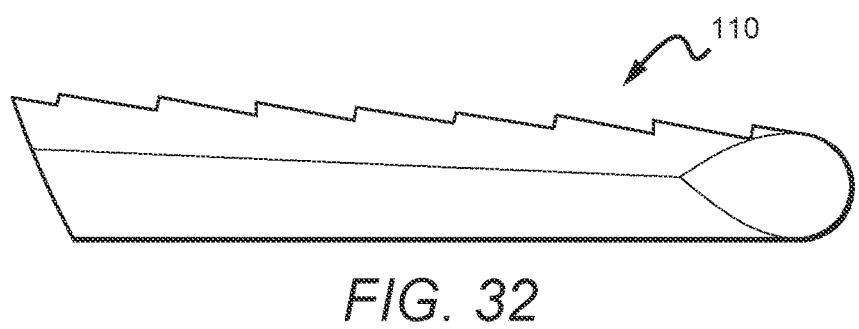
FIG. 32 is a close-up side view of a side portion of the thinner end of wedge 110.

FIG. 32 shows a close-up side view of a side portion of the thinner end of wedge 110.

Although the disclosure should not be bound by any particular scientific theories, the following explanations of how certain embodiments operate in response to a high energy event are provided to better illustrate certain characteristics of the devices disclosed herein.

In one operational example, an ED may be placed in the container 100, with the container 100 being subsequently secured. After the ED detonates, an explosive shock propagates and eventually arrives at the interior surface of the first layer 101 of the container 100. The transmitted stress propagates into the first layer 101 which, in this embodiment, comprises a metal foam layer. After transmitting its peak allowable stress onto the second layer 102, the first layer 101 begins to fail. This mechanism absorbs energy from the accepted wave and uses it to damage the first layer 101. The wave propagating through the material encounters the second layer 102, and a portion is reflected internally to be trapped successively within the first layer 101, delaying the arrival of peak stress at the interface and allowing a gradual loading of the successive face. Eventually the first layer 101 reaches maximum density and begins to transmit load directly onto the second layer 102.

The transmitted stress begins initially to transmit into the second layer 102 at peak allowable stress in the first layer 101. This direct stress falls to the failure stress of the first layer 101 almost immediately. The applied stress to the second layer 102 during this time period is the failure stress of the first layer 101, plus successive transmitted waves into it from the first layer 101. However, as these waves transmit through the second layer 102, they cause densification and eventual crushing, reducing energy subsequently. As each wave reaches the distal face of the second layer, the same reflection/transmission process occurs due to acoustic impedance mismatching, thus trapping the waves, and delaying peak stress in the third layer 103. As the second layer 102 experiences release, i.e., each time a wave reflects from the distal face, some of the material will be ejected into the fireball from the explosion. This material is inert and will have a high surface area. This serves to reduce the thermal energy of the fireball, and according to the gas laws, the pressure applied in the container 100.

These previous interactions serve to clip the peak load, i.e., the peak load cannot be transmitted to the third layer 103 and has dissipated by the time load is applied to it, thus reducing the load on the third layer 103. Further, each mechanism has delayed the arrival of the load and reduced the available energy the third layer 103 has to dissipate.

The residual load is applied to the thick fourth layer 104. This layer 104 has a very high strain-to-failure characteristic. The third layer 103 serves to delay the expansion of the container 100 further, adding stiffness and reducing the final energy incident on the fourth layer 104. As the fourth layer 104 begins to expand, it slowly reacts against the adjacent layers. The deformation allows gaps to open in the interface of the lid 106 the container 100. This controlled opening allows gas to vent from the container 100 at a controlled rate, allowing the container to manage the quasi-static pressure.

The hot vented gas passes through the sleeve 108, which, in one embodiment, comprises high-strength fibers dosed with electrospun nano-fibers, cooling the expanding gasses and reducing the pressure to a safer level. Eventually enough gas is vented that the container 100 contracts containing the residue.

In another operational example, an LI battery experiencing thermal runaway may be placed within the container 100 which is then secured. The container 100 rapidly heats and is filled with fumes. The fourth layer 114 of the lid 106 acts as a low pressure (e.g., pressure<2 bar) seal and contains the toxic fumes. Heat slowly propagates through the first layer 101 and begins heating the second layer 102. If the heat increases sufficiently, the first layer 101 will melt but will be contained within the second layer 102. The phase change may occur fairly uniformly across the entire interior surface of the first layer 101 which is a desirable distribution of the thermal energy. The second layer 102 heats up but prevents heat from reaching the breakdown temperature of the third and fourth layers 103, 104, preventing venting. Thus, the combination of the first layer 101 and the second layer 102 can form an extremely effective thermal barrier to prevent heat from propagating to the third and fourth layers 103, 104. In embodiments where a container is only necessary to contain a thermal high energy event, the container may simply comprise a foam metal layer, a pressed powder layer, and a heat-resistant outer layer formed from a material such as basalt fibers, for example.

Although the present invention has been described in detail with reference to certain preferred configurations thereof, other versions are possible. Embodiments of the present invention can comprise any combination of compatible features shown in the various figures and can comprise any combination of materials discussed or referenced in the disclosure, and these embodiments should not be limited to those expressly illustrated and discussed. Therefore, the spirit and scope of the invention should not be limited to the versions described above.

We claim:

1. A container for containing and mitigating high energy events, said container comprising:
   a body shaped to define an interior chamber and an opening through which said interior chamber can be accessed when said container is in an unassembled state, said body comprising a plurality of layers arranged in an ordered sequence, said plurality of layers comprising:
      a first layer adjacent to said interior chamber, wherein said first layer comprises a metallic foam;
      a second layer disposed adjacent to said first layer and opposite said interior chamber comprising a pressed inert powder;
      a third layer disposed adjacent to said second layer and opposite said first layer; and
      a fourth layer disposed adjacent to said third layer and opposite said second layer;
   a lid shaped to cover said opening such that when said lid and said body are assembled such that said container is in an assembled state, said interior chamber is fully enclosed within said container; and
   a fastener for affixing said lid to said body.

2. The container of claim 1, said first layer comprising an aluminum foam.

3. The container of claim 2, said first layer having a density of approximately 0.5 g/cm$^3$.

4. The container of claim 1, said second layer further comprising a silicon dioxide ($SiO_2$) base.

5. The container of claim 4, said second layer further comprising glass wool fibers dispersed in said $SiO_2$ base.

6. The container of claim 1, said third layer comprising an E-glass.

7. The container of claim 1, said third layer comprising alumino-borosilicate glass with less than 1% w/w alkali oxides.

8. The container of claim 1, said fourth layer comprising polyurethane (PU).

9. The container of claim 8, said fourth layer having a 300-400% strain-to-failure criteria and a Shore hardness between 50D and 60A.

10. The container of claim 1, said lid comprising first, second, third, and fourth lid layers, each of which comprises a material that corresponds to the respective materials of said first, second, third, and fourth layers of said body.

11. The container of claim 1, said fastener comprising:
   a sleeve sized to fit over said container when it is in said assembled state such that a slight gap is present between said container and said sleeve; and
   a pair of opposing wedges sized to be inserted into said gap between said container and said sleeve from opposite ends of said sleeve to secure said lid snugly against said body.

12. A containment system, comprising:
   a body shaped to define an interior chamber and an opening through which said interior chamber can be accessed when said container is in an unassembled state, said body comprising a plurality of layers arranged in an ordered sequence, said plurality of layers comprising:
      a first layer disposed adjacent to said interior chamber, said first layer comprising a metallic foam;
      a second layer disposed adjacent to said first layer and opposition said interior chamber, said second layer comprising a pressed inert powder;
      a third layer disposed adjacent to said second layer and opposition said first layer, said third layer comprising an E-glass; and
      a fourth layer disposed adjacent to said third layer and opposite said second layer, said fourth layer comprising polyurethane (PU); and
   a lid configured to releasably fasten to said body to cover said opening such that when said lid and said body are assembled such that said containment system is in an assembled state, said interior chamber is fully enclosed within said containment system.

13. The containment system of claim 12, further comprising a fabric sleeve sized to fit over said containment system when it is in said assembled state.

14. The containment system of claim 13, further comprising pair of opposing wedges sized to be inserted into said gap between said lid and said sleeve from opposite ends of said sleeve to secure said lid snugly against said body.

15. The containment system of claim 14, said wedges comprising a set of opposing ridges to prevent back-out when said wedges are inserted into said sleeve between said lid and said sleeve.

16. The containment system of claim 13, further comprising an inflatable bladder disposed between said lid and said sleeve such that said bladder can be rapidly inflated to urge said lid snugly against said body.

17. The containment system of claim 12, wherein each of said plurality of layers has a different density.

18. The containment system of claim 12, said fourth layer comprising a gasket which is seated in a dugout groove cut into a top surface of said fourth layer.

19. The containment system of claim 12, said first layer comprising an aluminum foam having a density of approximately 0.5 g/cm$^3$.

* * * * *